(12) United States Patent
Fouda et al.

(10) Patent No.: US 10,101,491 B2
(45) Date of Patent: Oct. 16, 2018

(54) SHIELDING DEVICE FOR IMPROVING DYNAMIC RANGE OF ELECTROMAGNETIC MEASUREMENTS

(71) Applicant: HALLIBURTON ENERGY SERVICES, INC., Houston, TX (US)

(72) Inventors: Ahmed E. Fouda, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/030,716

(22) PCT Filed: Aug. 20, 2014

(86) PCT No.: PCT/US2014/051933
§ 371 (c)(1),
(2) Date: Apr. 20, 2016

(87) PCT Pub. No.: WO2016/028294
PCT Pub. Date: Feb. 25, 2016

(65) Prior Publication Data
US 2016/0252644 A1    Sep. 1, 2016

(51) Int. Cl.
*G01V 3/00* (2006.01)
*G01V 3/28* (2006.01)
(Continued)

(52) U.S. Cl.
CPC ............ *G01V 3/28* (2013.01); *E21B 47/0905* (2013.01); *E21B 47/12* (2013.01); *E21B 49/00* (2013.01)

(58) Field of Classification Search
CPC ... G02B 3/00; G02B 6/32; G01V 3/28; G01V 3/30; E21B 47/12; E21B 49/00
(Continued)

(56) References Cited

U.S. PATENT DOCUMENTS

2009/0201221 A1   8/2009   Werner
2009/0273538 A1   11/2009  Smith et al.
(Continued)

FOREIGN PATENT DOCUMENTS

| WO | 2008076130 A1 | 6/2008 |
| WO | 2013072844    | 5/2013 |
| WO | 2013072844 A1 | 5/2013 |

OTHER PUBLICATIONS

Pendry, John B., D. Schurig, and David R. Smith. "Controlling electromagnetic fields." Science 312, No. 5781 (2006): 1780-1782.
(Continued)

*Primary Examiner* — Jeff Natalini
*Assistant Examiner* — Steven Yeninas
(74) *Attorney, Agent, or Firm* — Locke Lord LLP

(57) ABSTRACT

The disclosure concerns a device for obtaining electromagnetic measurements in a wellbore. In one implementation, the device includes an electromagnetic source carried by the device and a metamaterial arranged to cover a portion of the device in order to divert electromagnetic waves from the source around the covered portion of the device. In one version, the electromagnetic radiation from the source impinging on the portion of the device covered by the metamaterial, and on the electronics carried by the devices that are covered by the metamaterial is reduced. Depending on the implementation, the electromagnetic source may be an antenna, such as a coil antenna. Also, the antenna coil may be wrapped circumferentially around the tool.

14 Claims, 9 Drawing Sheets

(51) Int. Cl.
    *E21B 47/09*         (2012.01)
    *E21B 47/12*         (2012.01)
    *E21B 49/00*         (2006.01)

(58) Field of Classification Search
    USPC ...... 73/152.55, 33; 250/505.1; 324/324–375;
        333/909, 912, 116, 239; 359/237, 238,
        359/278, 641, 642, 652, 653, 654, 665,
        359/708; 385/33; 343/909, 912
    See application file for complete search history.

(56) References Cited

U.S. PATENT DOCUMENTS

| | | |
|---|---|---|
| 2010/0305862 A1 | 12/2010 | Li |
| 2012/0280872 A1 | 11/2012 | Werner |
| 2012/0306500 A1 | 12/2012 | Bittar et al. |
| 2013/0141104 A1* | 6/2013 | Homan ............... E21B 47/102 324/339 |
| 2015/0218941 A1* | 8/2015 | Clarke ............... E21B 49/08 324/324 |

OTHER PUBLICATIONS

Pendry, John. "Metamaterials and the control of electromagnetic fields." Conference on coherence and quantum optics. Optical Society of America, 2007.

Kwon, Do-Hoon, and Douglas H. Werner. "Transformation electromagnetics: An overview of the theory and applications." IEEE Antennas and Propagation Magazine 52.1 (2010): 24-46.

Rahm, Marco, et al. "Optical design of reflectionless complex media by finite embedded coordinate transformations." Physical Review Letters 100.6 (2008): 063903.

Schurig, David, et al. "Metamaterial electromagnetic cloak at microwave frequencies." Science 314.5801 (2006): 377-980.

Tichit, Paul-Henri, Shah Nawaz Burokur, and André de Lustrac. "Antenna Design Concepts Based on Transformation Electromagnetics Approach." Radioengineering 21, No. 4 (2012): 955.

Smith, D. R., S. Schultz, P. Markoš and C. M. Soukoulis. "Determination of effective permittivity and permeability of metamaterials from reflection and transmission coefficients." Physical Review B 65, No. 19 (2002): 195104.

Wilson, Jeffrey D., and Zachary D. Schwartz. "Multifocal flat lens with left-handed metamaterial." Applied Physics Letters 86, No. 2 (2005): 021113-021113.

Erentok, Aycan, Richard W. Ziolkowski, J. A. Nielsen, R. B. Greegor, C. G. Parazzoli, M. H. Tanielian, Steven A. Cummer et al. "Low frequency lumped elementbased negative index metamaterial." Applied Physics Letters 91, No. 18 (2007): 184104-184104.

Freire, Manuel J., Ricardo Marques, and Lukas Jelinek. "Experimental demonstration of a $\mu=-1$ metamaterial lens for magnetic resonance imaging." Applied Physics Letters 93 (2008): 231108.

Xie, Yihong, Jianfeng Jiang, and Sailing He. "Proposal of cylindrical rolled-up metamaterial lenses for magnetic resonance imaging application and preliminary experimental demonstration." Progress in Electromagnetics Research 124 (2012): 151-162.

Pendry, J. B. "A chiral route to negative refraction." Science 306, No. 5700 (2004): 1353-1355.

Magnus, F., B. Wood, J. Moore, K. Morrison, G. Perkins, J. Fyson, M. C. K. Wiltshire, D. Caplin, L. F. Cohen, and J. B. Pendry. "A dc magnetic metamaterial." Nature materials 7, No. 4 (2008): 295-297.

Gömöry, Fedor, Mykola Solovyov, Ján Šouc, Carles Navau, Jordi Prat-Camps, and Alvaro Sanchez. "Experimental realization of a magnetic cloak." Science 335, No. 6075 (2012): 1466-1468.

Narayana, Supradeep, and Yuki Sato. "DC magnetic cloak." Advanced Materials 24, No. 1 (2012): 71-74.

Jiang, Wei Xiang, Chen Yang Luo, Hui Feng Ma, Zhong Lei Mei, and Tie Jun Cul. "Enhancement of current density by DC electric concentrator." Scientific reports 2 (2012).

PCT Written Opinion for PCT Application No. PCT/US2014/051933 dated Jun. 8, 2015.

International Search Report for PCT Application No. PCT/US14/51933 dated Jun. 8, 2015.

EP Search Report for EP Application No. 14900227.1 dated Jan. 30, 2018.

* cited by examiner

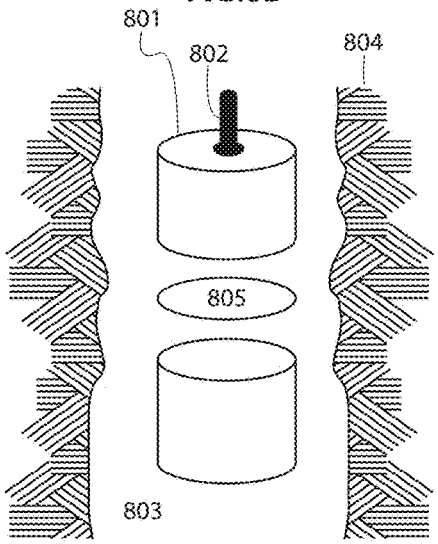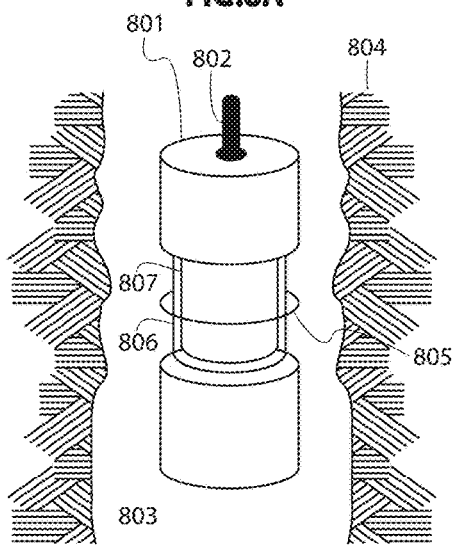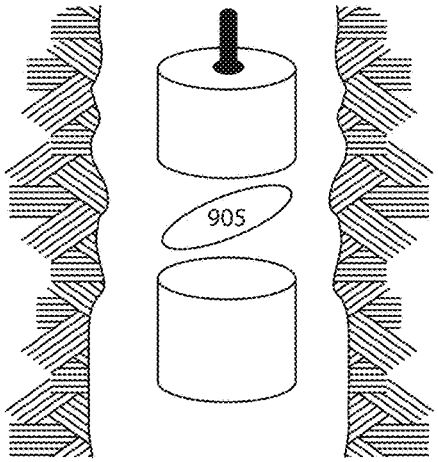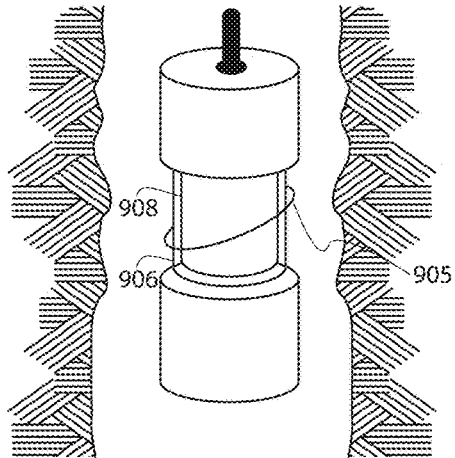

SHIELDING DEVICE FOR IMPROVING DYNAMIC RANGE OF ELECTROMAGNETIC MEASUREMENTS

TECHNICAL FIELD

The embodiments disclosed herein relate generally to methods and systems for downhole logging in oil and gas wells, and more particularly to antennas used in electromagnetic wellbore logging using metamaterials.

BACKGROUND

Electromagnetic well logging is an important technique used in the oil and gas industry. Logging tools to measure the resistivity or conductivity of subterranean earth formations adjacent a borehole have long been standard in the search for and recovery of hydrocarbons. Generally, a transmitter transmits an electromagnetic signal that passes through the formation around the borehole. These signals then induce a signal in one or more receivers located on the tool. The properties of the signals received after passing through the formation, such as amplitude and/or phase, allow well engineers to make resistivity or other measurements of the formation characteristics. The measurements and formation properties are then recorded as a function of the tool's depth or position in the borehole.

One important electromagnetic measurement is the determination of the dielectric constant of a downhole formation. A particularly suitable tool for this task is the High Frequency Dielectric Tool ("HFDT") available from Halliburton Corp. The HFDT may be used to measure the apparent dielectric constant and resistivity of a downhole formation and obtain formation properties, such as the water-filled formation porosity. The collection of information relating to conditions downhole, referred to as "logging," can be performed by several methods including wireline logging, logging while drilling ("LWD"), drillpipe conveyed logging, and coil tubing conveyed logging.

In wireline logging, a probe or "sonde" is lowered into the borehole after some or all of the well has been drilled. The sonde is suspended at the end of a cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters in the formation as is it being drilled. LWD techniques provide more contemporaneous formation measurements, but the drilling operations create a more difficult operating environment.

In drillpipe or coil tubing conveyed logging, sensing instruments are mounted on a tubing string, which moves the instrument package through an existing borehole. The tubing string enables logging of horizontal well bores without requiring the sensing instruments to tolerate the hostile drilling environment. Typically, the measurement data is stored in internal memory and recovered along with the instrument package.

Dielectric tools determine the dielectric constant and conductivity of downhole formations from the real and imaginary parts of the complex propagation constant of electromagnetic waves traveling through the formations. By measuring the phase difference and amplitude ratio between two points in the formation, the tool determines the formation resistivity and dielectric constant.

To transmit and receive the electromagnetic signals necessary for taking measurements, downhole logging tools use antennas. These antennas may be coils or they may be cavity antennas. Existing tool designs have undesirable limitations regarding these antennas, however. For example, the geometry of cavity antennas may be limited by other constraints involved in the design of the tool. Coil antennas are subject to distortion of the electromagnetic signal caused by the steel making up the tool backbone.

Accordingly, what is needed are tools and methods to overcome these shortcomings.

BRIEF DESCRIPTION OF DRAWINGS

FIGS. 8A-8B show an illustrative downhole tool having a cloaking metamaterial shield according to embodiments of the disclosure;

FIGS. 9A-9B show an illustrative downhole tool having a cloaking metamaterial shield according to embodiments of the disclosure.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the disclosure.

Figure 1:
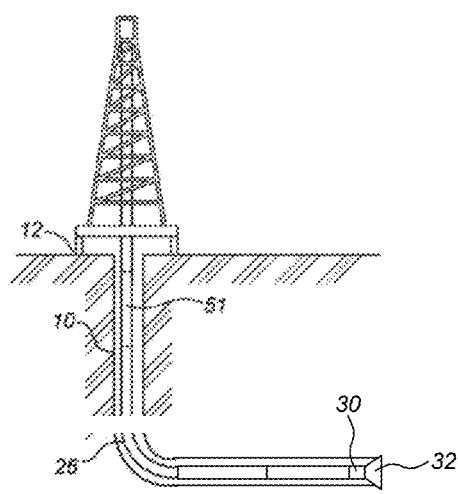
FIG. 1 is an illustration of a drilling rig useful in one or more embodiments.
Figure 1A:
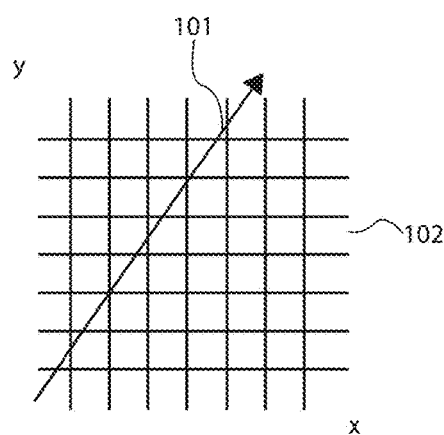
FIGS. 1A-1D illustrate an application of transformation optics according to one or more embodiments.
Figure 1B:
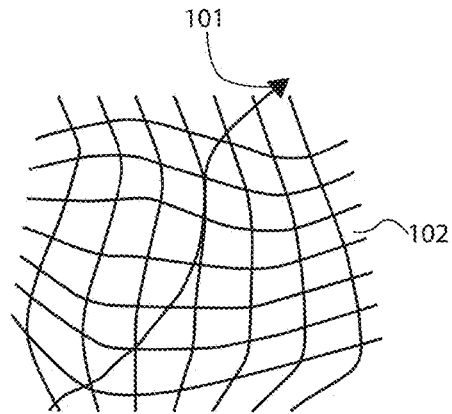

Embodiments of the disclosure concern techniques to control electromagnetic fields in well logging applications based on transformation optics. FIGS. 1A-1D illustrate the use of transformation optics for controlling an electromagnetic field. FIG. 1A shows an electromagnetic ray 101 depicted in the original space 102 shown as a grid in x-y coordinates. Using transformation optics, the underlying grid 102 may be thought of as being "elastic" and can be deformed to bend the ray 101 according to the shape of the grid, as depicted in FIG. 1B.

Mathematically, transformation optics can be described using Maxwell's equations. In the original space, Maxwell's equations may be written according to the equations:

$$\nabla \times E = -j\omega\mu H$$

$$\nabla \times H = j\omega \in E + J_s$$

In cylindrical coordinates, for example, Maxwell's equations can be transformed according to the following transformation:

$$\rho' = \rho'(\rho, \varnothing, z)$$

$$\varnothing' = \varnothing'(\rho, \varnothing, z)$$

$$z' = z'(\rho, \varnothing, z)$$

where $\rho$ is the radial, $\varnothing$ is the azimuthal, and z, is the axial component of the cylindrical coordinate system.

Maxwell's equations are form-invariant under coordinate transformation. In the transformed space, they take the following form:

$$\nabla' \times E' = -j\omega\mu' H'$$

$$\nabla' \times H' = j\omega \in' E' + J'_S$$

where $$\mu' = \frac{A\mu A^T}{|A|}$$

$$\in' = \frac{A \in A^T}{|A|}$$

$$J'_S = \frac{AJ_S|J_S|}{|AJ_S|}$$

and $$A = \begin{bmatrix} \frac{\partial \rho'}{\partial \rho} & \frac{\partial \rho'}{\rho \partial \phi} & \frac{\partial \rho'}{\partial z} \\ \frac{\rho' \partial \phi'}{\partial \rho} & \frac{\rho' \partial \phi'}{\rho \partial \phi} & \frac{\rho' \partial \phi'}{\partial z} \\ \frac{\partial z'}{\partial \rho} & \frac{\partial z'}{\rho \partial \phi} & \frac{\partial z'}{\partial z} \end{bmatrix}$$

where A is the Jacobian matrix of the transformation.

Due to the form-invariance of Maxwell's equations under coordinate transformation, the above transformations can be interpreted as if the original material within the deformed space is replaced by a generally anisotropic and inhomogeneous material. The transformations above reflect the material properties and the equivalent current source that should be used to realize the prescribed coordinate transformation.

Figure 2:
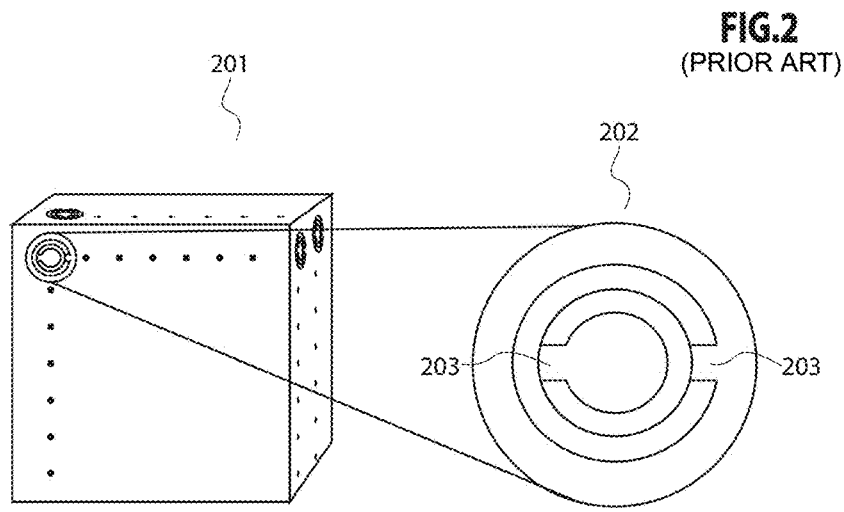
FIG. 2 shows an illustrative metamaterial unit cell.

Materials having suitable electromagnetic properties to shape the electromagnetic geometry of a space according to a desired transformation may not necessarily exist in nature. However, such desired transformations may be realized using what may be referred to as "metamaterials." Metamaterials useful in embodiments of the disclosure may be engineered composites that inherit their electrical properties from the geometry and arrangement of their constituting unit cells. Metamaterials can be realized in many different ways depending on the frequency of the electromagnetic radiation they are intended to control. While conventional materials attain their macroscopic properties from the chemical composition of the atoms they are made of, metamaterials attain their macroscopic properties from the design of their constituting unit cells. FIG. 2 illustrates a unit cell 201 useful in one or more embodiments of the disclosure. The unit cell 201 has a cubic geometry. In this embodiment, the cell 201 is internally hollow and is made from a suitable substrate material. The substrate may be made of non-conductive materials that are able to withstand the temperatures and pressures they would be exposed to downhole. Metamaterials may, in general, be described by inhomogeneous anisotropic permittivity and permeability tensors whose values lie within the range of radio frequencies used by downhole logging tools.

The outer surfaces of the unit cell 201 are imprinted with one or more electrically conductive split ring resonators ("SRRs") 202. In the embodiment depicted, each SRR 202 comprises a pair of "C-shaped" concentric split rings, with the "split" 203 in each ring arranged 180 degrees apart from each other. The SRRs may be formed from non-magnetic material such as copper. The periodic arrangement of the SRRs on the cell units causes electromagnetic waves to interact as though any material made from these cells was actually a homogeneous material. The SRRs are not limited to the concentric ring shapes depicted and other geometries suitable for SRRs may be used in other embodiments. Each SRR may be designed to have a particular electromagnetic response, depending on the frequency of the electromagnetic waves used to probe the downhole formation by the tool. Thus, design of the SRRs will vary depending on the frequency, or frequencies, of interest to the designer. Each unit cell, and by extension, any structure comprising a plurality of unit cells, will have an electromagnetic response that depends on the SRRs chosen. In some embodiments, the SRRs are uniform throughout the unit cell. In other embodiments, differently sized and/or shaped SRRs are used in a unit cell or in other unit cells comprising a particular structure.

In one embodiment, metamaterials designed using transformation optic rules are iso-impedance, i.e., they have the same intrinsic impedance as the background medium, and therefore, do not introduce spurious reflections, as would be the case with conventional materials. Transformations that preserve grid continuity across the transformed space boundary result in reflectionless, iso-impedance metamaterials.

Another implementation of the disclosure uses a class of transformations called embedded transformations. In embedded transformations, the grid continuity is broken and therefore reflectionless transmission across the metamaterial/background medium interface is not guaranteed. However, embedded transformations provide a higher degree of flexibility for manipulating fields outside the metamaterial device, and can be designed in such a way to minimize spurious reflections.

Figure 3A:
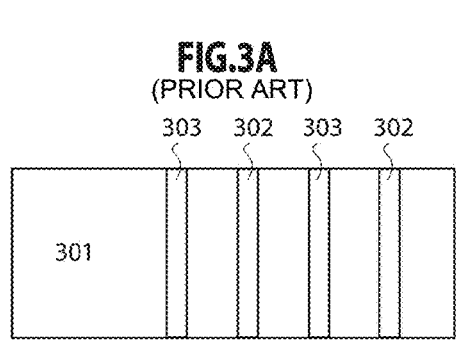
FIGS. 3A-3F show an illustrative metamaterial useful in a cavity antenna.
Figure 3B:
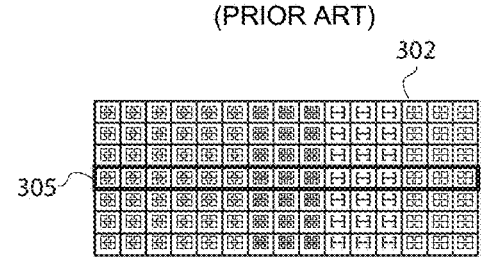
Figure 3C:
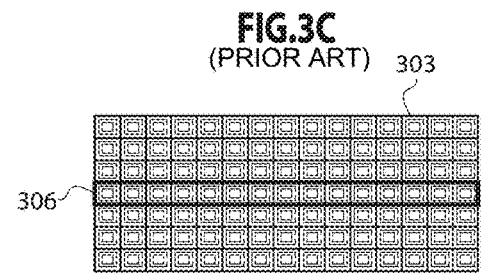

FIG. 3A shows a directive metamaterial ("MM") antenna 301 suitable for use in one or more embodiments of the disclosure. The MM antenna 301 comprises alternating electric and magnetic MM layers, 302 and 303 respectively.

Figure 3D:
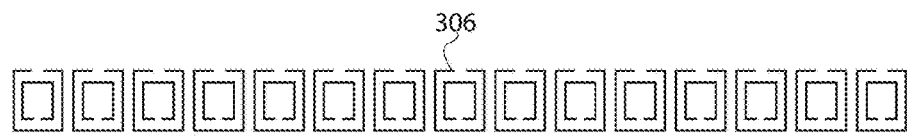
Figure 3E:
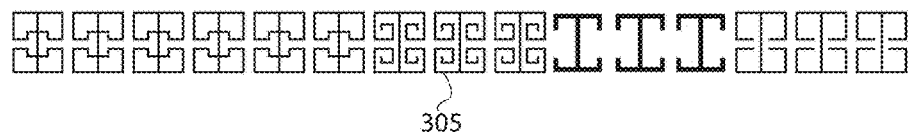
Figure 3F:
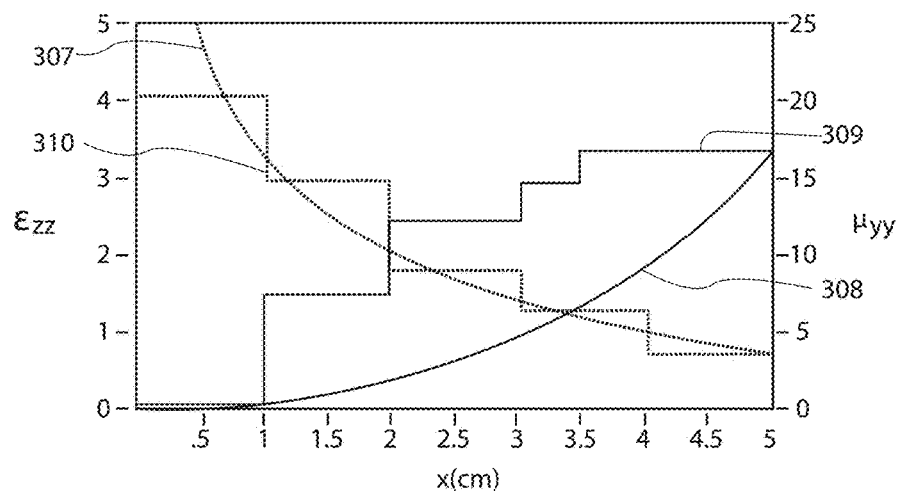

In this implementation, the MM antenna is designed to approximate the desired electromagnetic profile depicted by the smooth curve 308 for $\varepsilon_{zz}$ and curve 307 $\mu_{yy}$, as shown in FIG. 3F, where $\varepsilon_{zz}$ is the z-component of the permittivity tensor, and $\mu yy$ is the y-component of the permeability tensor. Of course, the desired smooth curves cannot be attained exactly, so the electric MM layers 302 realize the discretized $\varepsilon zz$ profile 309 using rows of electric-LC resonators (ELCs), such as row 305 shown in FIG. 3E, while the magnetic MM layers 303 realize the discretized $\mu yy$ profile 310 using rows of SRRs, such as row 306 shown in FIG. 3D.

Figure 1C:
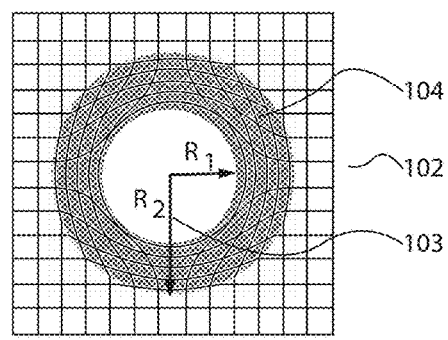
Figure 1D:
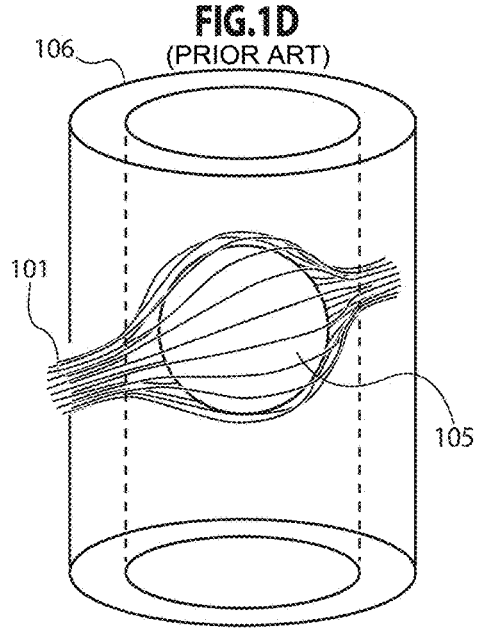

In another implementation, transformation optics allows for the shielding of sensitive downhole equipment in a manner similar to so-called invisibility cloaking. FIG. 1C shows a grid 102 transformed to create an enclosure 103 in the inner region ($\rho<R_1$) while maintaining the grid 102 intact in the outer region ($\rho>R_2$). A metamaterial is positioned in the region $R_1<\rho<R_2$ to mimic the grid deformation 104 shown in the figure. The transformation illustrated in FIG. 1C allows rays to be smoothly directed around the inner region 103 regardless of the material content of this inner space, rendering any object placed in the inner space 103 essentially "invisible" to electromagnetic radiation at frequencies responsive to the MM. FIG. 1D shows a three-dimensional view of a set of rays 101 being directed around region 105 created by a MM material inside a downhole tool 106.

Figure 4A:
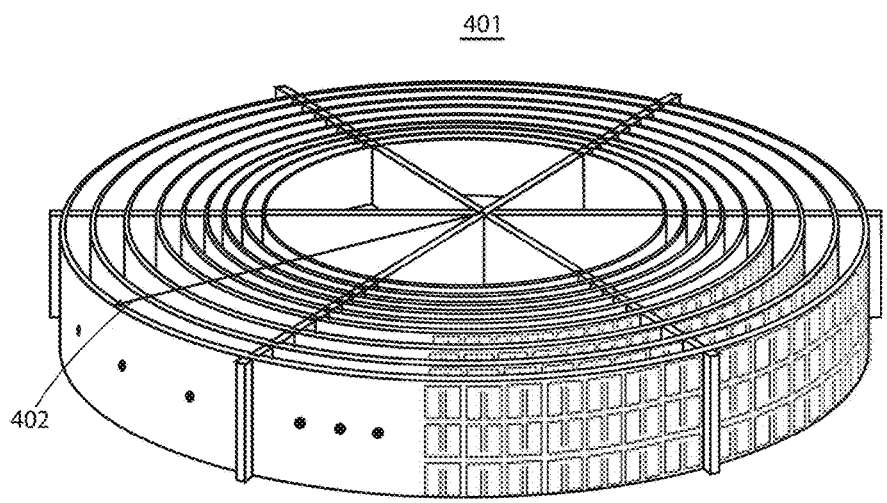
FIGS. 4A-4B show an illustrative metamaterial electromagnetic shield for shielding sensitive downhole equipment.
Figure 4B:
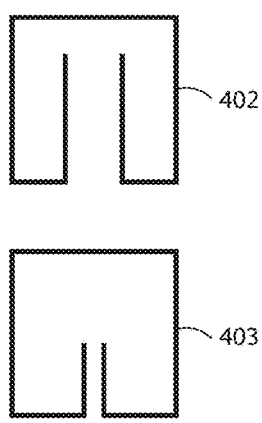

FIG. 4A shows a two-dimensional "invisibility cloak" or shield 401 capable of providing an electromagnetic shield for a downhole tool according to one or more embodiments. The shield 401 is in the shape of a collar and requires the radial component of the permeability tensor ($\mu_{rr}$) 402 to vary radially over the range of the concentric rings of metamaterial. The electromagnetic profile is created by using concentric cylinders with printed split ring resonators (SRRs) such as SRRs 402 and 403. The dimensions of the SRRs in each cylinder are adjusted to achieve the required electromagnetic profile, with different SRRs having different dimensions depending on their location on the shield 401. To be able to provide the collection of SRRs with effective macroscopic material properties, the dimension of the unit cell has to be much smaller than the operating wavelength; this is known as the homogenization condition, and is described generally in, for example, Smith et al, "Determination of Effective Permittivity and Permeability of Metamaterials from Reflection and Transmission Coefficients " Physical Review B 65, No. 19 (2002). Nevertheless, the dimension of the SRR has to be large enough to resonate at or near the operating frequency of the electromagnetic radiation used by the tool to probe the formation. Low frequency of operation in embodiments of downhole tools makes implementing the homogenization principle readily applicable.

In another embodiment, the electromagnetic properties of the downhole tool can be transformed using metamaterials having a negative index of refraction ("NIR"). A negative index material is a metamaterial structure having a refractive index that is negative over a certain frequency range. An NIR lens is an example of embedded transformation optics where double negative (DNG) metamaterials (also known as left-handed (LH) metamaterials) are used. Negative permeability may be realized using SRRs. Negative permittivity may be realized using thin wires.

Figure 5:
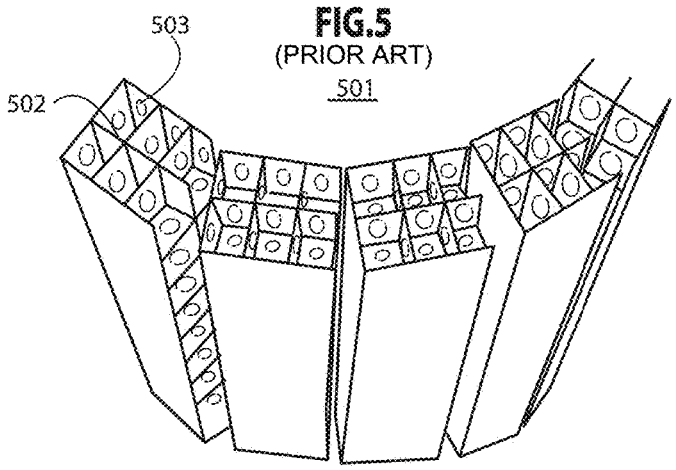
FIG. 5 shows an illustrative metamaterial electromagnetic lens.

The dimensions of the SRRs and ELCs required to resonate at lower frequencies become prohibitively large for practical realization. To address this difficulty, lumped components can be used to achieve resonance at lower frequencies without increasing the unit cell dimensions. Example lumped components useful in embodiments may be found in Erentok et al., "Low Frequency Lumped Element Based Negative Index Metamaterial," Applied Physics Letters 91, No. 18 (2007) FIG. 5 shows an example of a cylindrical rolled-up MM lens 501 having a plurality of unit cells 502 arranged adjacently in five columns of 2×3 structures, with the unit cells being provided with split ring capacitors 503. Similar lenses have been used to enhance the sensitivity and spatial resolution of RF coils in magnetic resonance imaging ("MRI") systems, but may also be adapted to control the electromagnetic fields in well logging applications by using transformation optics in an implementation optimized for the wavelengths at used by the tool, and the physical geometry of the downhole logging tool. Note that since the operating wavelength of MRI RF coils is much larger than the coil's dimensions (quasi-magnetostatics regime), an NIR MM lens can be sufficiently implemented as an SNG lens with $\mu_r=-1$.

Figure 6A:
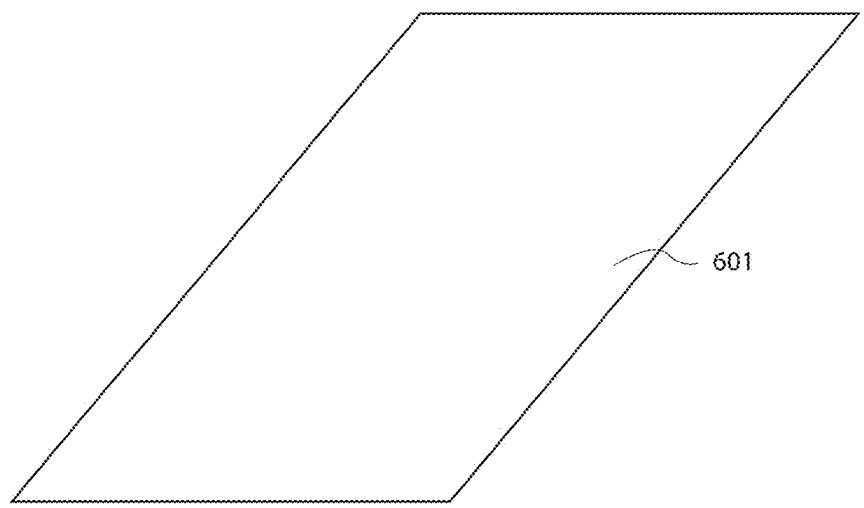
FIGS. 6A-6B show illustrative chiral metamaterials.
Figure 6B:
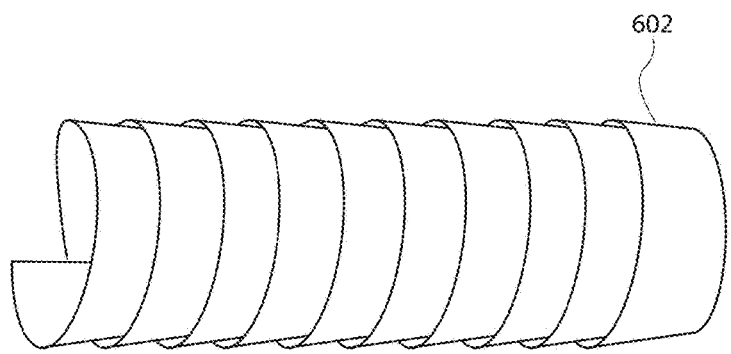

In another embodiment, an alternative design of DNG metamaterials involves chiral materials. As shown in FIGS. 6A-6B, a chiral MM 601 consists of insulated metal strips wound in a helix, and then individual helixes are stacked in a 3-D arrangement to form an isotropic DNG structure 602. This design has the advantage that its unit cells (chiral helixes) can have internal resonances with dimensions in the order of 1/1000th of the operating wavelength. This feature is particularly important for designing MMs operating at very low frequencies (quasi-static MMs).

Some of the MM realization techniques described above rely on resonant structures for operation. This may cause the metamaterial to be highly dispersive and lossy when operated near resonance. This may also mean that a metamaterial with given properties can only be designed to operate at a single frequency. For example, the meta material can be implemented as a diamagnetic metamaterial. Example diamagnetic metamaterial may be found in Magnus, "A DC Magnetic Metamaterial," Nature Materials 7, No. 4 (2008). In other embodiments, the metamaterial may be implemented as a DC magnetic cloak. An implementation of an example DC magnetic cloak may be found in Gömöry, "Experimental Realization of a Magnetic Cloak," Science 335, No. 6075 (2012). And, in still further embodiments, the metamaterial may be implemented as a DC electric concentrator. An example DC electric concentrator may be found in Jiang, "Enhancement of Current Density by DC Electric Concentrator " Scientific Reports 2 (2012). In some implementations, the use of metamaterials may be extended to quasi-static and DC applications.

According to the present disclosure, metamaterials can be advantageous in well logging electromagnetics for a number of reasons. Metamaterials enable narrow band, single-frequency operation of most tools relevant to this disclosure. Metamaterials accommodate the regular cylindrical geometry of most tools relevant to this disclosure. The generally low operating frequencies of such tools enhance the application of the homogenization condition described above. Furthermore, electric and magnetic fields are decoupled in many tools relevant to this disclosure; this decoupled relationship facilitates the realization of metamaterials using a reduced set of material properties. Another reason that metamaterials can be advantageous in well logging electromagnetics is that the predefined field polarization of most tools relevant to this disclosure facilitates the design of an appropriate metamaterial using a reduced set of parameters. Additionally, if SNG and DNG are not needed, non-resonant, low loss metamaterials operating at wavelengths much longer than the unit cell can be designed.

Downhole tools are conventionally constructed using steel backbones that support the structure of the tools and often carry electronic equipment. Referring now to FIG. 1, an oil drilling rig is shown for implementing certain aspects of the exemplary embodiments disclosed. The drilling rig may be used to drill a borehole 10 from a surface location 12, which may be a ground surface, a drilling platform, or any other location outside of the borehole 10 from which drilling may be controlled. The drilling rig may have a string 26 suspended therefrom composed of jointed drilling tubing or a continuous length of pipe known as coiled tubing that is made of relatively short pipe sections 51, connected to one another. A wireline or slickline may also be used with the oil drilling rig in order to introduce downhole tools according to one or more embodiments into the wellbore. A wireline or slickline may be mounted on a spool attached to a truck located at the rig site. Exemplary downhole tools may also be lowered into the wellbore on drilling tubing. One or more embodiments may be used for purposes such as logging while drilling ("LWD"), or measurement while drilling ("MWD"). The drill string 26 typically has a bottom-hole assembly attached to the end thereof that includes a rotary drilling motor 30 connected to a drill bit 32. Drilling is typically performed using sliding drilling, where the drill bit 32 isH rotated by the drilling motor 30 during drilling, but the coiled tubing is not rotated during drilling. The ability to perform sliding drilling, among other things, allows the trajectory of the bit 32 to be controlled to, thereby, drill in an angled direction, relative to the vertical, including a horizontal direction.

Figure 7C:
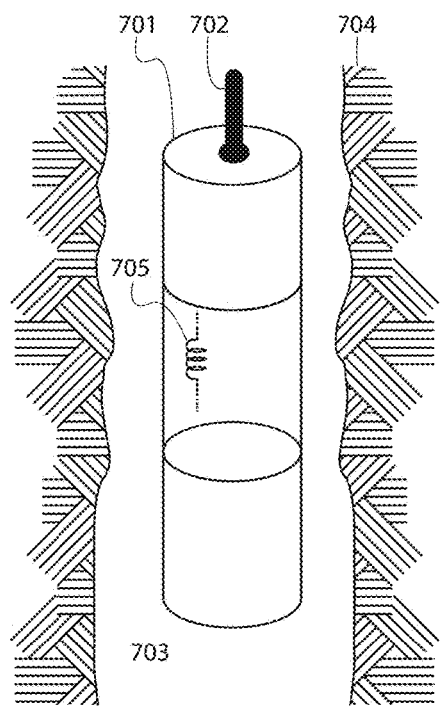
FIGS. 7A-7C show an illustrative downhole tool having a cloaking metamaterial shield according to embodiments of the disclosure.
Figure 7A:
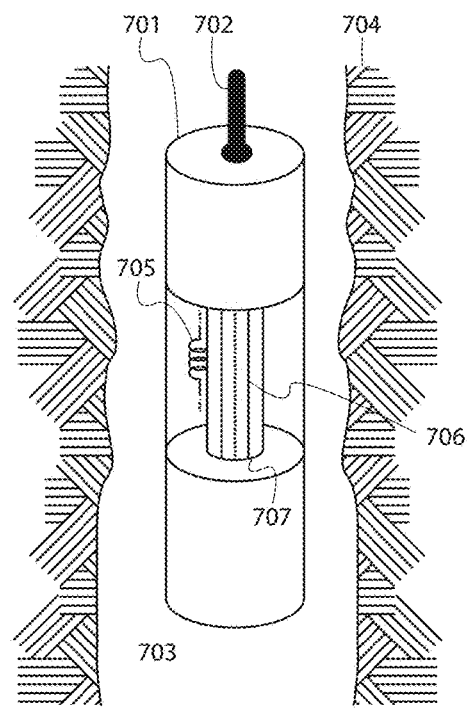

FIG. 7A shows a schematic diagram of a downhole resistivity logging tool. The tool includes a tool body 701 which is suspended from a wireline 702 into a borehole 703. The tool is in close proximity to the formation 704. The tool includes various antennas, such as coil 705, that transmit and receive electromagnetic signals to and from the formation 704. This allows well engineers to make various measurements, such as the resistivity and dielectric constant of the formation. The tool body 701 includes a tool backbone 706 that physically connects segments of the tool. Antennas, such as coil 705, are carried by the tool, often adjacent to the backbone 706 because of the mechanical dimensions and specifications required. Although the backbone 706 is necessary for the physical integrity of the tool itself, it is also a source of undesired signal distortion for the electromagnetic sensors carried by the tool. Eliminating or minimizing the undesired signal distortions due to the tool backbone 706 may require undesirable mechanical modifications to the tool body. These modifications may be avoided through the use of metamaterial shielding, or cloaking, according to embodiments of the disclosure.

Figure 7B:
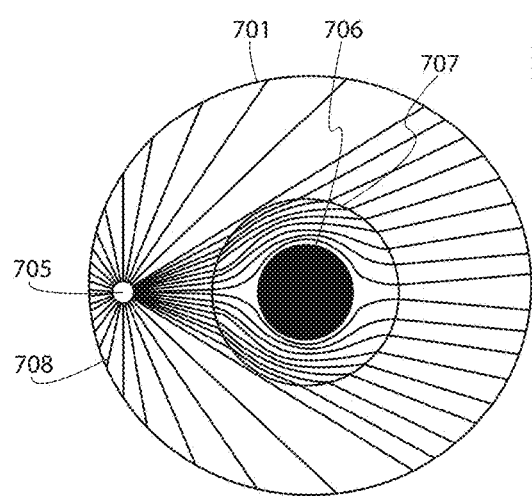

In one implementation of the disclosure, the sensors may be placed in a virtual free space region within the tool body that is unaffected by the signal distortions due to the tool backbone 706. In this embodiment, a cloaking metamaterial 707 is positioned around the tool backbone 706, as shown in FIG. 7A. The metamaterial 707 redirects the electromagnetic radiation around the tool backbone 706 as shown in FIG. 7B. FIG. 7B is a schematic diagram showing an illustrative horizontal cross-section of a tool body 701. The tool backbone 706 is surrounded by cloaking metamaterial 707. The antenna coil 705 is carried by the tool 701 but arranged outside the metamaterial 707. The electromagnetic radiation from the tools, as shown by rays 708, is redirected around the tool backbone 706 in a way that makes the tool backbone 706 invisible to the coil 705 as shown in FIG. 7B. This eliminates undesired signal distortions. Using the cloaking metamaterial to divert the fields around the cloaked tool backbone in such a way that no fields are scattered by the backbone, effectively rendering it invisible from the standpoint of the antenna. In addition to eliminating electromagnetic distortion and obviating, or at least reducing, the need for tool body corrections, the metamaterial cloak 707 also shields sensitive tool electronics inside the cloak by steering electromagnetic signals from the antenna away from other sensors carried by the tool.

A suitable metamaterial for this cloaking application may be comprised of unit cells of SRR and thin wires, such as the one described in FIG. 4A or B, wrapped around the backbone.

FIG. 7C is a schematic diagram illustrating how a tool would appear to the coil antenna 705 with cloaking metamaterial 707 in place around the tool backbone 706. The tool backbone 706 would be essentially invisible to the coil 705 and would be reduced or eliminated as a source of undesired signal distortion. Likewise, any electronic instrumentation carried by the tool inside the cloaking metamaterial would also be invisible to the coil 705 and not be affected by electromagnetic transmissions from the coil.

FIGS. 8A-9B show other embodiments of the disclosure in which cloaking metamaterial sleeves are used in tools comprising vertical or tilted coils. One or more embodiments using vertical or tilted coils may be used in logging while drilling ("LWD") or measurement while drilling ("MWD") applications. One or more embodiments may also be useful for geo-steering applications. One or more embodiments may also be useful in wireline, slick line or coiled tubing implementations. Vertical and tilted coils are frequently used in downhole sensors such as downhole resistivity sensors. FIG. 8A shows a downhole tool 801 suspended from wire line 802. The tool uses a vertical antenna coil 805 to transmit and receive electromagnetic signals to and from the formation 804. The coil 805 is positioned circumferentially around the tool body 801 in a channel formed in and around the tool body. The backbone of the tool 807 is surrounded by the antenna 805 which may cause electromagnetic distortions in the signals transmitted and received by the antenna. To prevent this, a cloaking metamaterial 806 is positioned around the tool backbone 807 and inside the vertical coil antenna 805. FIG. 8B illustrates the effect of the cloaking metamaterial 806, which is to cloak the tool backbone, and any electronics contained inside the backbone, from the vertical antenna 805. Thus, FIG. 8B illustrates the "virtual" electromagnetic design of the tool 801, according to embodiment of the disclosure.

FIG. 9A depicts an illustrative downhole tool having a cloaking metamaterial shield similar to that shown in FIG. 8A, except that instead of a vertical coil, there is provided a tilted coil 905. In a manner similar to the embodiment depicted in FIGS. 8A-B, a cloaking metamaterial 906 is positioned around tool body 908 and in between the tool body 908 and the interior of the tilted antenna 905. This produces the virtual design shown in FIG. 9B in which, again, the tilted antenna 905 is shielded from the electromagnetic distortions caused by the backbone of the tool and, likewise, any equipment carried on the inside of the backbone is shielded from the antenna.

Figure 10B:
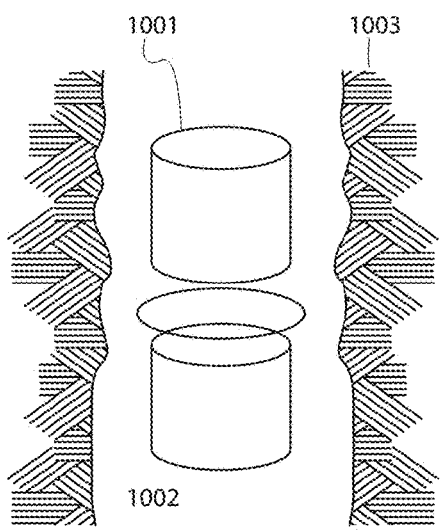
FIGS. 10A-10B show an illustrative downhole tool having a cloaking metamaterial shield according to embodiments of the disclosure.
Figure 10A:
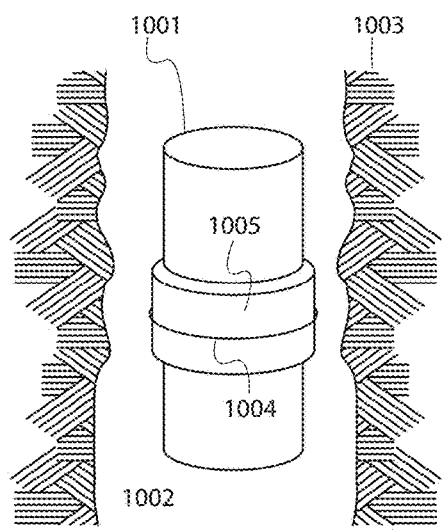

FIGS. 10A-B illustrate yet another embodiment of the disclosure adapted for well-monitoring applications where electromagnetic coils are wrapped around casing. In this embodiment, metamaterial shells can be used to cloak part of the well casing under the coils. FIG. 10A shows a section of casing 1001 disposed inside of wellbore 1002. The casing 1001 is positioned in formation 1003 and has an electromagnetic coil 1004 arranged around its circumference to provide electromagnetic measurements for monitoring the well. In conventional well-monitoring applications, the coil 1004 is subject to electromagnetic distortions and losses, for example, due to eddy currents induced in the casing 1001. According to one or more embodiments, a cloaking metamaterial 1005 is positioned circumferentially around a section of casing 1001 and between the casing 1001 and the interior of the coil antenna 1004 as shown in the figure. This shields the coil 104 and creates a virtual electromagnetic design as illustrated in FIG. 10B. This is substantially equivalent to creating an air coil between discontinuous sections of the casing 1001. This increases the effective cross-section area of the coil 1004 and minimizes losses due to eddy currents induced in the casing.

Another embodiment of the disclosure provides a device for obtaining electromagnetic measurements in a wellbore. The device may include an electromagnetic source carried by the device, and a metamaterial arranged to cover a portion of the device to divert electromagnetic waves from the source around the covered portion of the device. Advantageously, the electromagnetic waves from the source do not impinge on the portion of the device covered by the metamaterial, or the amount of impingement is reduced by the metamaterial. This may be achieved by diverting the electromagnetic radiation from the source around the backbone of the downhole tool. The device may be a well logging tool with an antenna that provides an electromagnetic source. The antenna may transmit and/or receive electromagnetic radiation. Multiple antennas may be used on a device. The device may also operate at multiple frequencies. Of course, it may be necessary or desirable to design the metamaterial unit cells to divert the specific frequencies used by the tools to prevent distortions or losses. The antennas may be coils of any design, such as vertical or tilted coils positioned circumferentially around the downhole tool.

In some embodiments, the device may further comprise any one of the following features individually or any two or more of these features in combination: (a) a device for obtaining electromagnetic measurements in a wellbore, wherein the device is a well logging tool comprising an antenna that provides an electromagnetic source; (b) a device for obtaining electromagnetic measurements in a wellbore, wherein the antenna is a coil antenna that is positioned circumferentially around the device; (c) a device for obtaining electromagnetic measurements in a wellbore, wherein the antenna is a coil antenna that is positioned non-circumferentially around the device; (d) a device for obtaining electromagnetic measurements in a wellbore, wherein the antenna is a coil antenna that is tilted with respect to a longitudinal axis of the device; (e) a device for obtaining electromagnetic measurements in a wellbore, wherein the metamaterial is arranged circumferentially around a central portion of the logging tool; (f) a device for obtaining electromagnetic measurements in a wellbore, wherein the device is a longitudinal section of wellbore casing having a coil antenna wrapped circumferentially around it with a metamaterial positioned circumferentially around the longitudinal section and between the casing and the antenna; (g) a device for obtaining electromagnetic measurements in a wellbore, wherein the metamaterial comprises a plurality of unit cells including split ring resonators; (h) a device for obtaining electromagnetic measurements in a wellbore, wherein the metamaterial comprises a plurality of unit cells including electric-LC resonators or thin wires; (i) a device for obtaining electromagnetic measurements in a wellbore, wherein the metamaterial comprises an electric layer which influences the electric field of the electromagnetic signal using a plurality of electric-LC resonators or thin wires, and a magnetic layer which influences the magnetic field of the electromagnetic signal using a plurality of split ring resonators; (j) a device for obtaining electromagnetic measurements in a wellbore, wherein the metamaterial comprises a chiral material; (k) a device for obtaining electromagnetic measurements in a wellbore, wherein the metamaterial has substantially the same intrinsic impedance as the background material of the device.

Another embodiment of the disclosure pertains to a method for making electromagnetic measurements in a wellbore. The method may include positing a device in the wellbore which has an electromagnetic source with a metamaterial arranged to cover a portion of the device to divert electromagnetic waves from the source around the covered portion of the device. The method may also include transmitting an electromagnetic signal from the source into a portion of the subterranean formation adjacent to the device and receiving an electromagnetic signal containing information about the electromagnetic properties of the formation. By using a metamaterial, the received electromagnetic signal may be substantially free of any distortions due to the portion of the device covered by the metamaterial.

In some embodiments, the method may further comprise any one of the following features individually or any two or more of these features in combination: (a) a method for making electromagnetic measurements in a wellbore, further comprising using a well logging tool comprising an antenna coil that creates an electromagnetic source; (b) a method for making electromagnetic measurements in a wellbore, comprising using an antenna coil that is positioned circumferentially around the device to create an electromagnetic source; (c) a method for making electromagnetic measurements in a wellbore, comprising using an antenna coil that is positioned non-circumferentially around the device to create an electromagnetic source; (d) a method for making electromagnetic measurements in a wellbore, comprising using an antenna coil having an axis that is tilted with respect to a longitudinal axis of the well logging tool; (e) a method for making electromagnetic measurements in a wellbore, wherein the metamaterial is arranged to cover a central portion of the logging tool.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claims.

What is claimed is:

1. A device for obtaining electromagnetic measurements in a wellbore comprising:

an electromagnetic source carried by the device; and a metamaterial wrapped around the device to divert electromagnetic waves from the electromagnetic source around the device;

wherein the device is a well logging tool or a longitudinal section of wellbore casing and the electromagnetic source is a coil antenna positioned circumferentially around the device; and wherein the metamaterial is wrapped around a portion of the device that causes diversion of the electromagnetic waves to thereby reduce distortion of the electromagnetic waves caused by the device.

2. A device for obtaining electromagnetic measurements in a wellbore according to claim 1, wherein the metamaterial comprises a plurality of unit cells including split ring resonators.

3. A device for obtaining electromagnetic measurements in a wellbore according to claim 1, wherein the metamaterial comprises a plurality of unit cells including electric-LC resonators or thin wires.

4. A device for obtaining electromagnetic measurements in a wellbore according to claim 1, wherein the metamaterial comprises an electric layer which influences the electric field of the electromagnetic signal using a plurality of electric-LC resonators or thin wires, and a magnetic layer which influences the magnetic field of the electromagnetic signal using a plurality of split ring resonators.

5. A device for obtaining electromagnetic measurements in a wellbore according to claim 1, wherein the metamaterial comprises a chiral material.

6. A device for obtaining electromagnetic measurements in a wellbore according to claim 1, wherein the metamaterial has substantially the same intrinsic impedance as the background material of the device.

7. A device for obtaining electromagnetic measurements in a wellbore according to claim 1, wherein the metamaterial has a negative index of refraction.

8. A method for making electromagnetic measurements in a wellbore, the method comprising:
    positioning a device in the wellbore, the device having an electromagnetic source carried by the device and a metamaterial wrapped around the device to divert electromagnetic waves from the electromagnetic source around the device;
    transmitting an electromagnetic signal from the electromagnetic source into a portion of the subterranean formation adjacent to the device; and
    receiving an electromagnetic signal containing information about the electromagnetic properties of the formation;
    wherein the device is a well logging tool or a longitudinal section of wellbore casing and the electromagnetic source is a coil antenna positioned circumferentially around the device; and
    wherein the metamaterial is wrapped around a portion of the device that causes diversion of the electromagnetic signal to thereby reduce distortion of the electromagnetic signal caused by the device.

9. A method for making electromagnetic measurements in a wellbore according to claim 8, wherein the metamaterial has a negative index of refraction.

10. A method for making electromagnetic measurements in a wellbore according to claim 8, wherein the metamaterial comprises a plurality of unit cells including split ring resonators.

11. A method for making electromagnetic measurements in a wellbore according to claim 8, wherein the metamaterial comprises a plurality of unit cells including electric-LC resonators or thin wires.

12. A method for making electromagnetic measurements in a wellbore according to claim 8, wherein the metamaterial comprises an electric layer which influences the electric field of the electromagnetic signal using a plurality of electric-LC resonators or thin wires, and a magnetic layer which influences the magnetic field of the electromagnetic signal using a plurality of split ring resonators.

13. A method for making electromagnetic measurements in a wellbore according to claim 8, wherein the metamaterial comprises a chiral material.

14. A method for making electromagnetic measurements in a wellbore according to claim 8, wherein the metamaterial has substantially the same intrinsic impedance as the background material of the device.

* * * * *